United States Patent [19]

Carr

[11] Patent Number: 4,463,018

[45] Date of Patent: * Jul. 31, 1984

[54] ARTIFICIAL BAIT FOR AQUATIC SPECIES

[75] Inventor: William E. S. Carr, St. Augustine, Fla.

[73] Assignee: University of Florida, Gainesville, Fla.

[*] Notice: The portion of the term of this patent subsequent to Jan. 20, 1998 has been disclaimed.

[21] Appl. No.: 369,208

[22] Filed: Apr. 16, 1982

Related U.S. Application Data

[60] Continuation-in-part of Ser. No. 336,706, Jan. 4, 1982, abandoned, which is a continuation of Ser. No. 189,634, Sep. 22, 1980, abandoned, which is a division of Ser. No. 020,089, Mar. 13, 1979, Pat. No. 4,245,420.

[51] Int. Cl.$^3$ .......................... A23K 1/18; A23L 1/04
[52] U.S. Cl. ...................................... 426/1; 43/42.06; 426/805
[58] Field of Search ................... 426/1, 576, 657, 805; 43/42.06

[56] References Cited

U.S. PATENT DOCUMENTS

| | | | |
|---|---|---|---|
| 1,393,617 | 10/1921 | Frame | 43/42.06 |
| 2,797,519 | 7/1957 | Keller | 43/42.06 |
| 2,826,853 | 3/1958 | Guy et al. | 43/42.06 |
| 2,874,048 | 2/1959 | Walldov | 426/1 |
| 2,979,778 | 4/1961 | Simons | 43/42.06 |
| 3,220,960 | 11/1965 | Wichterle | 260/2.5 |
| 3,428,459 | 2/1969 | Hinds | 426/1 |
| 3,903,304 | 9/1975 | Groninger et al. | 426/1 |
| 3,971,152 | 7/1976 | Husson, Jr. | 43/42.06 |

FOREIGN PATENT DOCUMENTS

| | | | |
|---|---|---|---|
| 53-5240 | 2/1978 | Japan | 426/1 |
| 53-92294 | 8/1978 | Japan | 426/1 |

OTHER PUBLICATIONS

Carr; William—Chemical Stimulation of Feeding Behavior in the Pinfish, Lagodon Rhomboides: A New Approach to an Old Problem, pp. 161-166.

Carr; William—Chemical Stimulation of Feeding Behavior in the Pinfish, Lagodon Rhomboides: Characterization and Identification of Stimulatory Substances Extracted from Shrimp, pp. 437-441.

Primary Examiner—George Yeung
Attorney, Agent, or Firm—Kerkam, Stowell, Kondracki & Clarke

[57] ABSTRACT

Artifical bait comprising a water-insoluble matrix which is permeable by diffusion at a predetermined and controlled rate over a prolonged period of time to an attractant incorporated therein upon immersion in an aqueous medium.

5 Claims, No Drawings

ARTIFICIAL BAIT FOR AQUATIC SPECIES

CROSS REFERENCE TO RELATED INVENTIONS

This application is a continuation-in-part application of application Ser. No. 336,706, filed Jan. 4, 1982, now abandoned, which is a continuation of application Ser. No. 189,634 filed Sept. 22, 1980, now abandoned which is a division of application Ser. No. 020,089, filed Mar. 13, 1979, now U.S. Pat. No. 4,245,420, granted Jan. 20, 1981.

BACKGROUND OF THE INVENTION

The present invention relates to an artificial bait particularly adapted for fishing in both fresh and sea water.

Artificial baits have been proposed heretofore comprising absorbent materials which have been soaked in a liquid fish attractant. Generally, the attractant-soaked material is incorporated in an artificial lure which depends for the attraction of fish upon the physical shape of the lure as well as the chemical characteristics of the attractant.

Thus, U.S. Pat. No. 1,393,617, discloses the inclusion of a fish oil soaked cotton swab in an artificial structure containing a hole through which the fish oil escapes upon immersion in water. U.S. Pat. No. 2,826,853, describes an artificial fish lure which contains a strip of chamois soaked with a fish attracting liquid such as anise, fish oil, etc.

U.S. Pat. No. 2,979,778, describes an artificial fishing lure constructed of rigid plastic in the shape of a natural fish prey having incorporated therein a fish attractant which is capable of migration through the plastic for progressive release at its surface.

U.S. Pat. No. 2,797,519, also describes an artificial lure which contains a porous resilient plastic or sponge rubber surface capable of absorbing fish attractant for subsequent release upon immersion in water.

My U.S. Pat. No. 4,245,420 discloses and claims an Artificial Bait for Aquatic Species which generally comprises a semi-rigid, flexible, water insoluble, hydrophilic matrix which is permeable by diffusion, to the passage of an attractant incorporated in the hydrophilic matrix and which is capable of releasing the attractant upon immersion in an aqueous medium. In general the patent discloses a hydrophilic matrix composition consisting of gelatin and water or gelatin, water and glycerin. Experience has now shown that the composition of my prior patent probably does not provide for a commercial aquatic species bait as the composition is not sufficiently resistant to heat.

U.S. Pat. No. 2,874,048, Walldov, is directed to an Aquatic Species Synthetic Bait having a composition very similar to that disclosed in my prior patent and which according to the patentee is slowly soluble in water to similate bleeding of the bait.

An object of the present invention to provide an artificial bait for aquatic species that is substantially insoluble in water and which has a prolonged shelf life and is very heat insensitive. This later property is very important from the point of view of manufacturing, drying, handling and storage before delivering, shelf life in shops, and stability in the hands of fisherman. It has been determined that the product is resistant to temperatures up to at least 140° F.

It is a further object to provide such a bait or matrix which has incorporated therein an attractant which is capable of diffusion from the substantially insoluble matrix upon immersion in an aqueous medium.

A further object is to provide an artifical bait wherein the diffusion of the attractant from the bait is at a predetermined and controlled rate over a prolonged period of time.

SUMMARY OF THE INVENTION

An artifical bait is provided which comprises a tough semi-rigid flexible material which resembles in texture, common fish prey or flesh and which contains a fish attractant which is released at a controlled rate over prolonged periods of time upon immersion in water. The artificial baits of the present invention have been found to be far superior to those of the above-described art in that they are heat resistant, have substantial shelf life and substantial and prolonged water life and that they closely resemble common fish prey in that they are formed of hydrophilic macromolecular substances and further, that the rate of release of attractant and the time period over which the bait is effective are subject to better standards of control than in prior art artificial baits.

DETAILED DESCRIPTION OF THE INVENTION

In its preferred aspect, the semi-rigid, flexible, water-insoluble, hydrophilic matrix comprises the solid or semi-solid phase formed from a colloidal solution of a liquid, preferably water, in a macromolecular composition including gelatin, agar, locust bean gum, Celufil (a partially hydrolyzed cellulose manufactured by U.S. Biochemical Corp.) and glycerol prepared at a temperature not exceeding 100° C. all as to be more fully set forth hereinafter. The hydrophilic, gel-like solid phases of such colloidal solution is peculiarly adapted for the formation of artificial fish baits having the texture and consistency of common and natural fish prey.

The attractant is preferably incorporated in the matrix by inclusion in the colloidal solution prior to the formation of at least a portion of the solid or semi-solid phase thereof. If the attractant is homogeneously distributed throughout the colloidal solution prior to gelling to form the solid phase, the attractant will be uniformly distributed throughout the resulting matrix. If the colloidal solution is partially gelled prior to the addition of the attractant, the latter will be concentrated mainly at the outer surfaces of the resulting solid or gelled matrix. Thus, the matrix can be formed such that a gradient concentration of attractant is achieved throughout the dimensions of the bait.

The predominate matrix-forming substances, gelatin, agar and locust bean gum, form gels closely resembling natural fish prey in texture and are subject to control of attractant release rates.

Matrices formed from these substances in gel-like form have a pliable, flesh-like texture which, when grasped or otherwise contacted by fish, feels and, when an attractant is incorporated therein, tastes like a natural food.

It is preferred to include within the matrix a flexible, reinforcing substrate which substantially maintains the physical integrity of the matrix upon immersion in an aqueous medium. Generally, the artificial bait is formed in flat layers and cut into strip-like lengths for use on a fish hook. It is preferred to pour the colloidal solution into a shallow pan and to place therein a layer(s) of the reinforcing substrate prior to formation of the solid phase. The reinforcing element is then internally imbedded within the solid phase of the matrix, thereby acting as an internal reinforcement of the matrix.

Suitable reinforcing, flexible substrates include natural and synthetic woven and non-woven fabrics, paper, natural and synthetic plastics, leather, hide, metal, wood and composites thereof. It will be apparent to those skilled in the art that the reinforcing substrate(s) may be included within the matrix at any point prior to formation of the completely gelled, solid phase of the collodial solution. Any suitable fish attractant may be incorporated within the matrix of the artificial bait. Suitable attractants include liquified fish or other marine products, fish oils, anise and synthetic attractants. Generally, any fish attractant in liquid form, capable of diffusion through the matrices of the artificial baits of the present invention may be utilized.

A suitable method for preparing a fish attractant involves the utilization of any existent natural bait, i.e., squid, shrimp, herring, spanish sardines, bunker, fish meal or dried fish foods of the type which will liquify when added to the soft, non-gelled matrix. Additionally, materials which are normally disposed of in fishery operations, such as shrimp heads, fish heads, carcasses, trash fish, trash invertebrates, etc., may also be employed to prepare attractant mixtures. Obviously, different attractant mixtures have a different stimulatory capacity for a particular species of fish. Accordingly, attractant mixtures may be tailored for specific "target" species.

Very useful attractants can be prepared following the procedures disclosed in the following publications:

Carr et al, "Chemical Stimulation of Feeding Behavior in the Pinfish, Lagodon rhomboides: A New Approach To An Old Problem", Comp. Biochem, Physiol., Vol. 54A, pp 161-166 (1976);

Carr et al, "Chemical Stimulation of Feeding Behavior in the Pinfish, Lagodon rhombiodes: Characterization and Identification of Stimulatory Substances Extracted From Shrimp" Comp. Biochem, Physiol., Vol. 54A, pp 437-441 (1976);

Carr et al, "Chemoreception and Feeding Behavior in the Pigfish, Orthopristics chrysopterus: Characterization and Identification of Stimulatory Substances in a Shrimp Extract," Comp. Biochem., Physiol., Vol. 55A, pp 153-157;

The artificial bait is prepared by providing a colloidal solution of a liquid, preferably water, in the macromolecular substance which provides the resulting matrix; adding thereto the attractant and allowing the colloidal solution to substantially completely solidify thereby forming the matrix containing the entrapped attractant.

Where it is desired to include a flexible, reinforcing substrate, the latter is provided within the colloidal solution prior to complete solidification of the matrix.

Where is it desired to provide a gradient concentration of the attractant throughout a dimension of the matrix, the attractant is added to the colloidal solution in the desired shape after partial solidification and/or at various stages of the solidification process.

The amount of attractant solute depends ultimately upon the intended use of the artificial bait and upon the nature of the attractant. Generally, the amount of solute containing attractant may vary from about 0.1 to 30%, by weight, based on the weight of the artificial bait.

Preferably the attractant is incorporated within the colloidal solution by stirring or mixing. Alternatively, the attractant may be added only to the surface of the partially solidified or soft gel by dropwise addition, spraying, sprinkling, etc.

The colloidal solution or soft gel may be poured over the reinforcing material to provide strength and structural integrity. This procedure makes it very convenient to prepare the gels in sheets of convenient size using shallow trays or molds. Depending upon the characteristics of the desired product, the colloidal solution or soft gel may be poured onto the reinforcing material, or both under and onto the reinforcer. Alternatively, the reinforcing material may be added to the surface of the soft gel followed by the addition of further amounts of colloidal solution.

A further alternative embodies introduction of the colloidal solution or soft gel into or onto a hollow reinforcing material.

The resulting gel containing reinforcing material and attractant is then dried or dehydrated. Drying increases the strength, durability and longevity of attractant release but decreases the rate of attractant release. Drying is accomplished at room temperature or up to about 50° C. by circulating air over the gels via fans or blowers.

Drying may also be accomplished in vacuo or by lyophilization. The duration of drying time is dependent upon the desired consistency of the finished bait. Drying times of 4 to 8 hours have been employed most frequently with baits intended for normal use.

Following completion of the drying step, the sheet of bait can be conveniently cut to any desired size, then wrapped or otherwise packaged and stored until needed.

The baits are designed for placing on a hook and fishing in the same manner as is done with non-live natural baits. The baits can be fished alone or together with a natural bait or cut into strips or sections and used in conjunction with jigs, and certain other conventional artificial lures, etc. Further, certain of the baits can be added to traps or pots to replace other baits or enhance the effectiveness of existing baits.

EXAMPLES

A 64 liter batch of improved bait consists of the following substances in 49 liters of water plus 11 liters of glycerol:

| Code Designation | Component | Amount (Kg) |
| --- | --- | --- |
| AL | Agar | 0.64 |
|  | Locust bean gum | 0.288 |
| G | Gelatin | 1.28 |
| CS | Celufil | 1.28 |
|  | Sorbic Acid | 0.12 |

The following steps comprise the preferred method of preparing the bait from the components AL, G, and CS, as set forth above:

The bait is prepared in two steps hereinafter designated Stages I and II.

Stage I contains water and the agar and locust bean gum and Stage II contains water and remainder of the of the ingredients CS, G and attractant.

Stage I

1. Measure out of 42 liters of water in large pot. Cover with lid and bring to boil.

2. With mixer on high speed to give vortex, add AL slowly to edge of vortex.
3. Let mixing continue until temperature rises again to least 96° C.

Stage II (Stage II is prepared while Stage I is brought to its initial boiling temperature)
1. Add 6.3 liters of hot water to small pot.
2. Turn mixer to high speed and slowly add CS. (This may require some stirring with a spoon to get it distributed homogeneously).
3. Add 11 liters of glycerol. Rinse glycerol container with small amount of hot water and add to the above.
4. Heat mixture to greater than 60° C. while constantly mixing with mixer at medium speed.
5. Turn mixer to high speed and slowly add the gelatin making sure all of the gelatin goes into solution.
6. Let stage II continue to warm with mixing.
7. After both Stages I and II are ready, drain Stage II into Stage I. Rinse Stage II-pot with small amount of hot water and add to the above. Mix the combined stages for 5-10 minutes.

At this time or following step 2 the selected attractant should be added if the attractant is to be uniformly distributed throughout the resulting matrix.

Pouring and Adding Reinforcer

With the temperature of the mixture maintained above 80° C. and preferably at 85°-90° C. the mixture is then poured into cooling trays and the reinforcement for the bait is added. If two layers of, for example, cheesecloth are to provide a sandwich for the matrix, the first layer of cheesecloth is laid on the bottom surface of the tray and wetted with a small amount of water and tamped or rolled to force out entrapped air. With the bottom layer of cheesecloth throughly wetted, the matrix mixture is poured into the tray and a top layer of cheesecloth is laid upon the mixture and gently tamped downwardly to insure a good bond between the matrix and the cheesecloth.

If only a single layer of reinforcing cloth is employed, the entire matrix mixture is poured into a tray and the cheesecloth reinforcement is laid over the top thereof and gently tamped to thoroughly impregnate the cloth with the mixture.

After the mixture has thoroughly gelled, the bait sheets are removed from their trays and placed on a drying rack. If only a single layer of reinforcing cloth is employed, the cloth side should be placed downwardly on the drying rack to prevent cutting of the undried bait.

Alternate Preparation Procedure

It has been found that suitable bait of a commercial quality can be prepared in a single stage rather than the two stages set forth hereinbefore, by following the following steps:
1. Add following to large pot and stir briefly with spoon to mix the two liquids:
    A. 48.5 liters of hot water.
    B. 11 liters of glycerol. Rinse glycerol container with small amount of water and add to the pot.
2. Heat the above to boiling.
3. With a mixer on high speed to give a vortex, add AL slowly to edge of vortex and scrape into the solution any AL that sticks to the side of the pot.
5. Continue mixing until all lumps of AL are gone and until the temperature in the pot is at least 96° C. Step 5 is the key to the success of the operation. Leave mixer on high speed for the following steps:
6. Add attractant, if the attractant is heat stable.
7. Add G slowly. Wait for the lumps to disappear.
8. Add CS slowly.
9. Mix for at least 10 more minutes before starting the pouring operation making sure the temperature of this entire mix is greater than 85° C. before it is poured.

Drying, cutting and wrapping as set forth hereinafter.

Suitable Ranges of Ingredients

The following table sets forth suitable ranges of ingredients based on an approximate 64 liter batch:

| Component | | Range |
| --- | --- | --- |
| Water | | 30 to 60 liters |
| Glycerol | | 3 to 20 liters |
| Code Designation | Component(s) | Amount (kg) |
| AL | Agar | 0.16 to 2.6 Kg |
|  | Locust bean gum | 0.06 to 1.3 Kg |
| G | Gelatin | 0.32 to 5.2 Kg |
| CS | Celufil | 0 to 6.4 Kg |
|  | Sorbic Acid | 0.03 to 0.37 Kg |

Drying and Packaging Bait

The drying racks containing the gelled bait are placed in a suitable dryer. A suitable drying temperature is about 40°-45° C. with circulation of air within the dryer. At this temperature drying of the gelled bait is completed in about 4 to about 8 hours. With the undried sheet approximately about 1 cm in thickness an ideal weight at the completion of drying would be about 1.1 g to about 1.2 g per square inch. Or stated differently with each sheet approximately 4 by 36 inches, an ideal dried weight would be about 140 to 152 Grams per sheet an acceptable weight range would be from about 130 to about 166 grams per sheet.

After the drying process these sheets are permitted to return to room temperature and thereafter the sheets of bait are cut into the appropriate size and wrapped in a plastic sheet for storage or packaged in a closed container for sale or use.

I claim:
1. An artificial bait comprising a semi-rigid, flexible, water-insoluble, hydrophilic matrix which is permeable, by diffusion, to the passage of an attractant for aquatic species incorporated therein and which is capable of releasing said attractant upon immersion in an aqueous medium at a predetermined and controlled rate over a prolonged period of time, said matrix comprising as the semi-solid phase of a colloidal solution of: from about 0.16 to about 2.6 Kg of Agar, from about 0.06 to about 1.3 Kg of Locust bean gum, from about 0.32 to about 5.2 Kg of Gelatin, from 0 to about 6.4 Kg of a partially hydrolyzed cellulose, from about 0.03 to about 0.37 Kg of Sorbic Acid, from about 30 to 60 liters of water and from about 3 to 20 liters of glycerol.
2. An artificial bait comprising a semi-rigid, flexible, water-insoluble, hydrophilic matrix which is permeable, by diffusion, to the passage of an attractant for aquatic species incorporated therein and which is capable of releasing said attractant upon immersion in an aqueous medium at a predetermined and controlled rate over a prolonged period of time; said matrix comprising the solid or semi-solid phase of a colloidal solution of
- 0.64 Kg of Agar,
- 0.288 Kg of Locust bean gum,
- 1.28 Kg of Gelatin,
- 1.28 Kg of a partially hydrolyzed cellulose,
- 0.12 Kg of Sorbic Acid, and
- 49 liters of water and 11 liters of glycerol.

3. The artificial bait of claims 1 or 2 wherein said attractant for aquatic species is incorporated in said matrix by inclusion in said colloidal solution prior to formation of at least a portion of said solid or semi-solid phase.

4. The artificial bait of claims 1 or 2, wherein said matrix is internally reinforced with a flexible substrate which substantially maintains the physical integrity of said matrix upon immersion in an aqueous medium.

5. A method of preparing the artificial bait comprising:
(1) providing a colloidal solution consisting of from about 30 to 60 liters of water; from about 3 to 20 liters of glycerol; from about 0.16 to about 2.6 Kg of Agar; from about 0.06 to about 1.3 Kg of Locust bean gum, from about 0.32 to about 5.2 Kg of gelatin, from 0 to about 6.4 Kg of a partially hydrolyzed cellulose, from about 0.03 to about 0.37 Kg of Sorbic Acid,
(2) adding thereto an attractant for aquatic species;
(3) allowing said colloidal solution to substantially completely solidify; and
(4) drying the solidified composition.

* * * * *